United States Patent
Kawakami

[11] Patent Number: 5,888,670
[45] Date of Patent: Mar. 30, 1999

[54] LITHIUM SECONDARY BATTERY AND ELECTRODES THEREFOR AND METHOD OF FORMING THE SAME

[75] Inventor: Soichiro Kawakami, Nara, Japan

[73] Assignee: Canon Kabushiki Kaisha, Tokyo, Japan

[21] Appl. No.: 616,630

[22] Filed: Mar. 15, 1996

[30] Foreign Application Priority Data

Mar. 17, 1995 [JP] Japan .................................. 7-058798
Feb. 23, 1996 [JP] Japan .................................. 8-036691

[51] Int. Cl.$^6$ .................................................. H01M 10/40
[52] U.S. Cl. .................................... 429/231.4; 429/231.95
[58] Field of Search ........................ 429/218; 423/447.1, 423/447.2; 502/180

[56] References Cited

U.S. PATENT DOCUMENTS 4,920,017  4/1990  Herscovici ................................ 429/42
5,518,836  5/1996  McCullough ............................. 429/94

*Primary Examiner*—Maria Nuzzolillo
*Assistant Examiner*—Carol Chaney
*Attorney, Agent, or Firm*—Fitzpatrick, Cella, Harper & Scinto

[57] ABSTRACT

The present invention provides a lithium secondary battery which has an anode, a separator, a cathode and an electrolyte and which employs intercalation and deintercalation reaction of lithium ions. The anode and/or the cathode of the secondary battery contains a carbonaceous material having a structure in which pores are oriented. The lithium secondary battery exhibits a high charge-discharge efficiency, a high energy density and a long cycle life. The present invention also provides a method of forming the lithium secondary battery including the carbonaceous material having oriented pores, by using an orienting material.

60 Claims, 4 Drawing Sheets

LITHIUM SECONDARY BATTERY AND ELECTRODES THEREFOR AND METHOD OF FORMING THE SAME

BACKGROUND OF THE INVENTION

1. Field of the Invention

The present invention relates to a lithium secondary battery and electrodes therefor and a method of forming the same. More particularly, the present invention relates to a lithium secondary battery which prevents dendritic deposition of lithium metal from occurring due to repeated charge and discharge and electrodes therefor and a method of forming the same.

2. Description of the Related Art

In recent years, the amount of $CO_2$ gas contained in atmosphere has been increasing, and it has been thus predicted that global warming occurs due to the greenhouse effect of $CO_2$ gas. It is therefore difficult to newly construct a thermal power plant which converts energy generated by burning fossil fuel such as petroleum or coal into electrical energy and which discharges a great amount of $CO_2$ gas.

In order to perform thermal power generation with a highest efficiency, it is preferable to operate the plant under constant conditions. Since the generated energy cannot be rapidly changed, the generated energy is controlled to providing power consumption in the daytime during which factories are generally consume a great amount of power. Under the present conditions, therefore, the generated power is wasted in the night during which power consumption decreases. It is thus proposed that, in order to effectively employ the electrical power generated by generators in a thermal power plant, the power generated at nighttime stored in secondary batteries installed in general homes, and is used in the daytime when the power consumption is increased, for leveling loads. This is known as load leveling. It is thus eagerly desired to develop secondary batteries which can be used for the load leveling.

It is also expected to develop high-energy density secondary batteries with excellent utility for electric vehicles which discharge no air pollutants such as carbon oxides (COx), nitrogen oxides (NOx), hydrocarbon (CH) and particles during driving.

Further, it is of urgent necessity to develop smaller secondary batteries which are more lighter weight and have higher performance, and which are used as power supplies for portable apparatus such as book-type personal computers, word processors, video cameras and portable telephones.

Since the reversible electrochemical lithium-graphite intercalation reaction was reported in JOURNAL OF THE ELECTROCHEMICAL SOCIETY 117,222 (1970), development of rocking chair type secondary batteries, i.e., "lithium ion batteries", as an example of small, lightweight and high-performance secondary batteries has proceeded in which carbon and an intercalation compound containing lithium ions are used as an anode active material and a cathode active material, respectively, so that lithium is intercalated into the carbon layer and stored therein by charge reaction. Some of such lithium ion batteries are being brought into practical use. In these lithium ion batteries, carbon serving as a host material for intercalating lithium as a guest material into the layer is used as the anode material so as to inhibit the growth of lithium dendrite during charge, thereby achieving long life in a charge-discharge cycle.

Since a secondary battery having long life can be achieved, as described above, the application of various types of carbon to anodes has been extensively proposed and investigated. A secondary battery is proposed in U.S. Pat. No. 4,702,977 in which a carbonaceous material having a hydrogen/carbon atomic ratio of less than 0.15, a (002) facing of 0.337 nanometer or more, and a crystallite c-axis size of 15 nanometer or less is used for an anode, and alkali metal ions such as lithium ions are used. Another secondary battery is proposed in U.S. Pat. No. 4,959,281 (Japanese Patent Laid-Open No. 2-66856) in which a carbonaceous material having a (002) facing of 0.370 nanometer or more, a true density of less than 1.70 $g/cm^3$ and no exothermic peak at 700° C. or more in differential thermal analysis in an air stream is used for an anode.

Examples of various types of carbon which are being investigated for use as battery anodes include carbon fibers (Denkikagaku, Vol. 57, p614 (1989)), mesophase microbeads (Extended Abstracts of The 34th Battery Symposium in Japan, p77 (1993)), natural graphite (Extended Abstracts of The 33th Battery Symposium in Japan, p217 (1992)), graphite whiskers (Extended Abstracts of The 34th Battery Symposium in Japan, p7 (1993)), and the burning product of furfuryl alcohol resin (Extended Abstracts of The 58th Annual Meeting of the Electrochemical Society of Japan, p158 (1991)).

However, a lithium ion battery which uses carbonaceous material as an anode active material for storing lithium and which has a discharge capacity exceeding the theoretical capacity of a graphite intercalation compound for storing one lithium atom for six carbon atoms, which permits stable discharge after repetition of charge and discharge, has not been yet obtained. The lithium ion battery using carbonaceous material as an anode active material thus has a long cycle life and a battery energy density lower than that of a lithium battery which uses a lithium metal as an anode active material.

It is difficult to bring a high-capacity lithium storage battery which uses a lithium metal for an anode into practical use because of the difficulties in preventing the occurrence of lithium dendrite, which mainly causes internal shorts, due to repetition of charge and discharge. When an anode and a cathode are short-circuited by the growth of lithium dendrite, heat is generated by consumption of the energy of the battery in the short-circuited portion within a short time, and gas is thus generated by decomposition of a solvent of an electrolyte. This causes an increase in the inner pressure of the battery and thus accidental damage to the battery.

A method has been proposed as a measure against this in which a lithium alloy such as lithium-aluminum is used for an anode for suppressing the reactivity of lithium. However, this method exhibits an unsatisfactory cycle life, and has not been brought into extensive practical use.

On the other hand, a high-energy density lithium secondary battery which has an energy density lower than that of a lithium primary battery and which uses an aluminum foil having an etched surface as an anode is reported in JOURNAL OF APPLIED ELECTROCHEMISTRY 22, 620–627 (1992). However, when a cycle of charge and discharge is repeated up to a practical range, cracks occur in the aluminum foil due to repeated expansion and contraction, thereby deteriorating the current collecting properties and causing the growth of dendrite. Thus, a secondary battery having a cycle life which permits use at a practical level cannot be obtained.

Therefore, it is eagerly desired to develop an anode material which has a long life and an energy density higher than that of a carbonaceous anode material which is currently put into practical use.

It is also necessary for realizing a high-energy density secondary battery to develop a cathode material. Under the present conditions, a lithium-transition metal oxide is mainly used as a cathode active material. However, the discharge capacity attained is only 40 to 60% of the theoretical capacity.

For lithium secondary batteries including "lithium ion batteries" which use lithium ions as a guest in charge-discharge reaction, it is strongly desired to develop an anode and a cathode which have a cycle life within a practical range, and capacity higher than that of an anode comprising carbonaceous material and a cathode comprising transition metal oxide, which are presently brought into practical use.

SUMMARY OF THE INVENTION

An object of the present invention is to provide a lithium secondary battery which uses lithium as an anode active material and which has a high energy density and a long cycle life, and electrodes for the lithium secondary battery, and a method of forming the same.

Another object of the present invention is to provide a lithium secondary battery which is capable of smoothly producing electrochemical reaction with a lower current density accompanied with charge and discharge, and which is capable of passing a large current during charge and discharge, and electrodes for the lithium secondary battery and a method of forming the same.

A further object of the present invention is to provide a lithium secondary battery having a high charge-discharge efficiency, and electrodes for the lithium secondary battery and a method of forming the same.

In accordance with one aspect of the invention a lithium secondary battery comprising at least an anode, a cathode, a separator disposed between the anode and the cathode and an electrolyte, wherein at least one of the anode and the cathode comprises a carbonaceous material having oriented pores.

According to another aspect of the present invention, there is provided an electrode for a lithium secondary battery which comprises a current collector, and an active material layer disposed on the current collector and comprising a carbonaceous material having oriented pores.

In a further aspect of the present invention, there is provided a method of forming an electrode for a lithium secondary battery comprising a current collector, and a carbonaceous material disposed on the current collector and having oriented pores. The method includes the step of burning a mixed material containing an organic polymer material and an orienting material to form the carbonaceous material.

According to a still further aspect of the present invention, there is provided a method of forming a lithium secondary battery comprising the steps of preparing a first electrode comprising a current collector and a carbonaceous material with oriented pores which is disposed on the current collector and which is formed by burning a mixed material containing an organic polymer material and an orienting material, disposing a second electrode opposite to the first electrode, disposing a separator between the first and second electrodes, and then sealing both electrodes, the separator and an electrolyte in a housing.

DETAILED DESCRIPTION OF THE PREFERRED EMBODIMENTS

Figure 1:
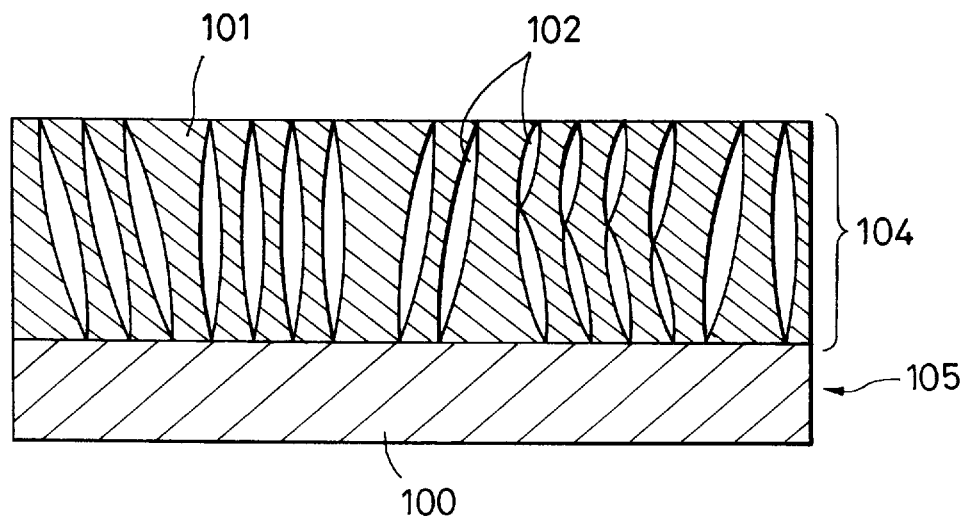
FIG. 1 is a schematic sectional view illustrating the structure of an anode which can preferably be used for a secondary battery of the present invention.

The present invention relates to the structure of an electrode (an anode or a cathode) of a lithium secondary battery comprising at least an anode, a cathode, a separator disposed between the anode and the cathode, and an electrolyte. The lithium secondary battery also comprises a carbonaceous material having oriented pores at least as a constituent material. The carbonaceous material having oriented pores can be formed by the step of mixing an organic polymer material and an orientating material.

In the present invention, the cathode carbonaceous material functions to assist conduction for collecting current from a cathode active material used as a host material for lithium ions, and the anode carbonaceous material functions as the host material for the lithium ions. Since the cathode and/or the anode comprises the carbonaceous material at least having a structure in which pores are oriented, the electrolyte easily permeates the electrode. As a result, it is possible to decrease the impedance of the battery, improve the charge-discharge efficiency and prevent secondary reaction during charge and discharge, thereby suppressing deterioration in the electrodes. It is thus possible to realize a lithium secondary battery having a high capacity and a long cycle life.

Further, when the cathode comprises the carbonaceous material in which the cathode active material as the host material for lithium ions is intercalated, since the carbonaceous material functioning as a conduction auxiliary material is present nearer the cathode active material than a cathode formed by coating a mixture containing a cathode active material, a conduction auxiliary and a binder, the higher collecting ability can be attained. As a result, the utilization of the cathode can be increased, and a high-capacity lithium secondary battery can thus be realized.

If the pores of the carbonaceous material layer are oriented at least in the direction toward the surface of the collecting electrode, preferably perpendicular or substantially perpendicular thereto, the electrolyte can easily permeates the electrode. It is consequently possible to perform rapid charge and discharge. In the anode, lithium can be deposited on the pore surfaces and in the pores other than between the carbonaceous material layers by charge reaction, thereby preventing the growth of dendritic lithium metal deposition. It is thus possible to realize a lithium secondary battery having a higher capacity. On the other hand, if the pores of the carbonaceous material layer are oriented at least in parallel with the surface of the collecting electrode, it is possible to increase the flexural strength of the electrode, and suppress the separation of the active material layer from the collecting electrode even when the electrode is wound in a spiral form.

If a collector having a rubbed surface is used as a collector (a collector of the cathode and/or the anode) on which a carbonaceous material layer is formed, it is possible to more effectively suppress the separation of the active material layer.

The method of forming the electrodes for the lithium secondary battery of the present invention comprises mixing an orientating material and an organic polymer material which can be carbonized or graphitized by burning, and burning the organic polymer material to form the carbonaceous material. Pores oriented in the carbonaceous material can easily be formed by any desired method for removing the orientating material after burning. The organic polymer material readily coordinates with a carbon-carbon double bond, an ether bond, an ester bond, or a polar group such as a benzene ring, which is generally possessed by the orientating material, to obtain the carbonaceous material having a high degree of graphitization. As a result, when the carbonaceous material is used as the host material of the anode for intercalating and deintercalating lithium ions, the high-capacity anode can be formed. Therefore, with the lithium secondary battery comprising the electrode comprising the carbonaceous material formed by this method and used for an anode active material layer, a high electric capacity and energy density can be attained.

In addition, the step of coating a coating solution, which is obtained by mixing the orientating material in a solution of the organic polymer material, on a substrate which was subjected to treatment of preorientation facilitates orientation of the orientating material during the formation of the carbonaceous material, thereby simply obtaining the carbonaceous material having oriented pores.

The present invention is described in detail below with reference to the drawings.

Figure 2:
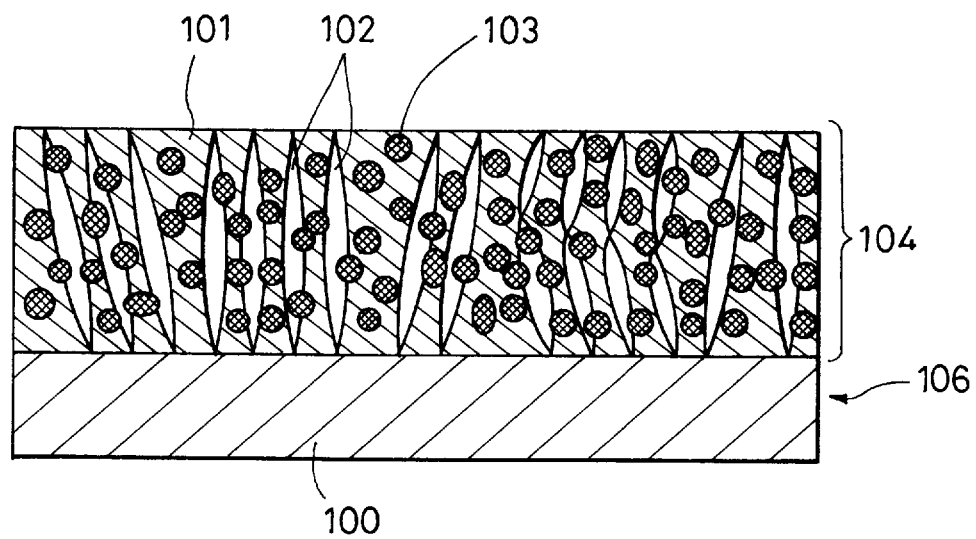
FIG. 2 is a schematic sectional view illustrating the structure of a cathode which can preferably be used for a secondary battery of the present invention.

FIG. 1 is a schematic longitudinal sectional view illustrating an anode which is preferably used for the secondary battery of the present invention. FIG. 2 is a schematic longitudinal sectional view illustrating a cathode which is preferably used for the secondary battery of the present invention.

In FIGS. 1 and 2, reference numeral 100 denotes a collector; reference numeral 101, a carbonaceous material; reference numeral 102, oriented pores; reference numeral 103, a cathode active material; reference numeral 104, an active material layer; reference numeral 105, an anode; and reference numeral 106, a cathode.

Referring FIGS. 1 and 2, the carbonaceous material 101 having the oriented pores 102 is provided on the collector 100. The pores 102 are oriented so that the lengthwise components thereof are in the direction toward the collector 100, and preferably oriented in the direction perpendicular or substantially perpendicular to the collector 100.

The anode 105 shown in FIG. 1 has a structure in which the active material layer 104 comprising the carbonaceous material 101 having the oriented pores 102 is provided at least on a portion of the surface of the collector 100, which contacts an electrolyte opposite to a cathode (not shown). The cathode 106 shown in FIG. 2 has a structure in which the active material layer 104 comprising the carbonaceous material 101 having the oriented pores 102 and containing the cathode active material 103 dispersed therein is provided at least on a portion of the surface of the collector 100, which contacts an electrolyte opposite to an anode (not shown).

Description will now be made of a preferred embodiment which uses a powdered carbonaceous material having oriented pores apart from the case in which a carbonaceous material layer having oriented pores is formed at least on side of the collector, as shown in FIGS. 1 and 2.

Figure 3:
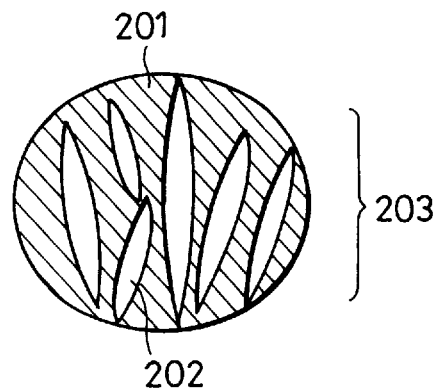
FIG. 3 is a schematic sectional view illustrating a carbonaceous material powder which can preferably be used for an anode of a secondary battery of the present invention.
Figure 4:
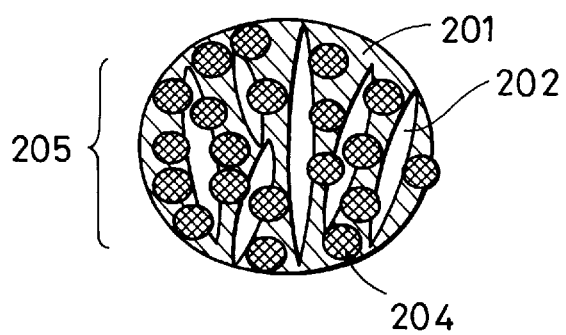
FIG. 4 is a schematic sectional view illustrating a carbonaceous material powder which can preferably be used for a cathode of a secondary battery of the present invention.

FIG. 3 is a conceptual sectional view of a powdered carbonaceous material having oriented pores, and FIG. 4 is a conceptual sectional view of the case in which an active material is dispersed in a powdered carbonaceous material having oriented pores.

In FIGS. 3 and 4, reference numeral 201 denotes a carbonaceous material; reference numeral 202, oriented pores; reference numeral 203, a carbonaceous material powder for an anode; reference numeral 204, a cathode active material; and reference numeral 205, a carbonaceous material powder for a cathode.

As shown in FIG. 4, the dispersed active material 204 is provided for the cathode.

Figure 5:
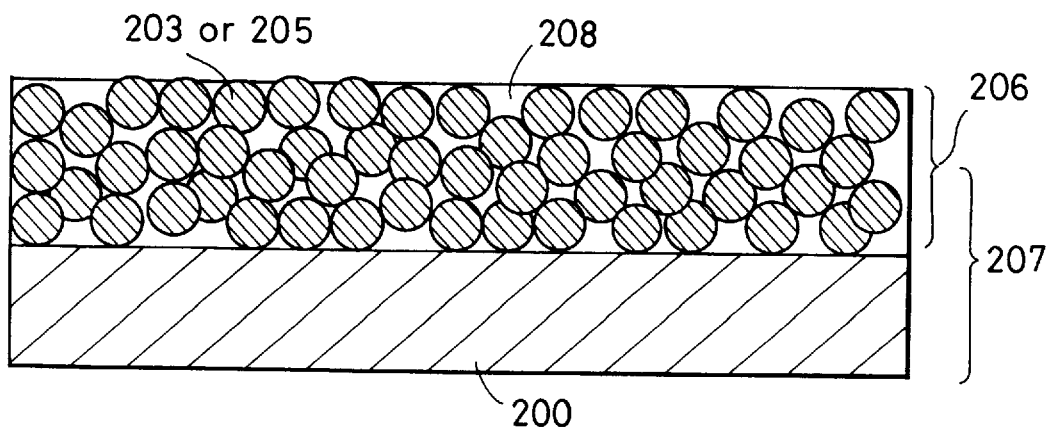
FIG. 5 is a schematic sectional view illustrating the structure of an electrode which can preferably be used for a secondary battery of the present invention.

FIG. 5 is a conceptual sectional view illustrating an example of the structure of an electrode (an anode or cathode) comprising the carbonaceous material powder 203 or 205 shown in FIGS. 3 or 4.

As shown in FIG. 5, an electrode (an anode or cathode) 207 comprises an active material layer 206 which is formed on a collector 200 by bonding the carbonaceous material powder 203 or 205 for the anode or cathode to the collector 200 using a binder 208.

The active material layer 206 may be formed on not only one side of the collector 200 but also both sides thereof or a main surface of the collector 200. This applies to the active material layer 104 shown in FIGS. 1 and 2.

The conceptual structure of the secondary battery of the present invention is described with reference to FIG. 6.

Figure 6:
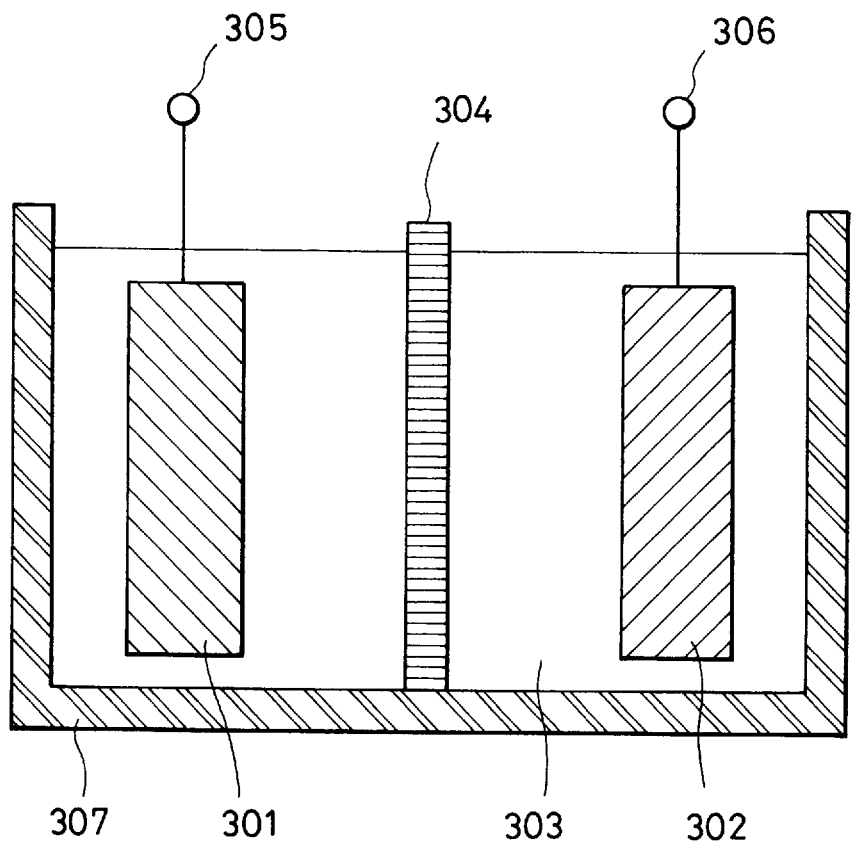
FIG. 6 is a schematic drawing illustrating an example of the basic construction of a secondary battery which uses the electrode shown in FIGS. 1, 2 or 5.

In FIG. 6, reference numeral 301 denotes an anode (electrode); reference numeral 302, a cathode (electrode); reference numeral 303, an electrolyte; reference numeral 304, a separator; reference numeral 305, an anode terminal; reference numeral 306, a cathode terminal; and reference numeral 307, a housing.

As shown in FIG. 6, the anode 301 and the cathode 302 are disposed in the electrolyte 303 held in the housing 307 opposite to each other through the separator 304. The separator 304 is provided for preventing internal shorts due to the contact between the anode 301 and the cathode 302.

The anode 301 and the cathode 302 respectively have the structures shown in FIGS. 1 and 2 or 5. The anode terminal 305 and the cathode terminal 306 are electrically connected to the collectors of the anode 301 and the cathode 302, respectively. The collectors of the electrodes may be respectively used as the anode terminal 305 and the cathode terminal 306. The anode terminal 305 and the cathode terminal 306 or at least a portion of the collectors may form at least a portion of the housing 307.

Each of the components of the battery is described in detail below.

[Electrode]

In the present invention, each of the electrodes comprises the carbonaceous material having oriented pores and formed at least on the collector.

A method of forming the anode shown in FIG. 1 in accordance with a preferred embodiment is described below.

An orienting material is mixed in a solution of an organic polymer material which is carbonized or graphitized by burning to prepare paste.

The paste prepared by the above step is then coated on the collector, and the organic polymer material in the paste is solidified under conditions for orienting the orienting material.

The orienting material is then removed from the solidified organic polymer material.

The remaining organic polymer material is carbonized or graphitized by burning under an inert gas or nitrogen gas to form the anode.

For example, a coater coating method or a screen printing method can be used for coating the paste. As a method of solidifying the organic polymer material, a method of removing a solvent and then drying, or a method of producing crosslinking reaction can be used. The orientation conditions depend upon the orienting material used.

The cathode shown in FIG. 2 can be formed by the same procedure as the above procedure for forming the anode except that the cathode active material is mixed in the paste in the first step.

A method of producing the cathode comprising the carbonaceous material powder for a cathode shown in FIG. 4 in accordance with a preferred embodiment is described below.

An orienting material and a cathode active material are mixed in a solution of an organic polymer material which is carbonized or graphitized by burning to prepare paste.

The organic polymer material in the paste prepared by the above step is solidified under conditions for orienting the orienting material.

The orientating material is then removed from the solidified organic polymer material.

The remaining organic polymer material is carbonized or graphitized by burning under an inert gas or nitrogen gas to prepare the carbonaceous material having oriented pores.

The carbonaceous material is then ground under an inert gas or nitrogen gas to prepare a carbonaceous material powder containing the cathode active material dispersed therein.

The carbonaceous material powder, a binder and a solvent are mixed to prepare paste.

The paste is coated on the collector, and then dried to prepare the cathode.

The anode active material shown in FIG. 3 and the anode shown in FIG. 5 can be formed by the same procedure as the above procedure for forming the cathode comprising the carbonaceous material powder shown in FIG. 4 except that the step of mixing the cathode active material in the paste is eliminated.

When a lithium battery is assembled by using the anode and cathode, the anode and cathode must be sufficiently dehydrated and dried. Dehydration is preferably performed by heating under reduced pressure.

(Organic Polymer Material as a Raw Material for the Carbonaceous Material)

A material which is carbonized or graphitized by burning is used as the organic polymer material as a raw material for the carbonaceous material having the oriented pores, which is a component of the anode or cathode of the present invention. Preferable examples of such a material include poly(vinylalcohol), poly(furfurylalcohol), poly(vinylacetate), polyacrylonitrile, poly(para-phenylene), poly(para-phenylenesulfide), poly(para-phenylenevinylene), polythienylene, polydithienylpolyene, poly(vinylnaphthalene), poly(acenaphthylene), poly(vinylchloride) and the like.

The burning temperature of the organic polymer material is preferably 600° to 3000° C. It is preferable that the organic polymer material is burned under an inert gas such as an argon gas or helium gas or a nitrogen gas, and that when the collector might be oxidized, hydrogen gas is appropriately mixed for suppressing oxidation.

(Orienting-Material)

Preferable examples of the orientating material used as a raw material for preparing the carbonaceous material having the oriented pores and used as a component of the anode or cathode of the present invention include (1) liquid crystal materials, and (2) diacetylene derivatives and diacetylene derivative polymers.

(1) Liquid Crystal Materials

The liquid crystal materials include thermotropic materials each of which forms a liquid crystal layer through a melting process, and lyotropic materials which exhibit crystallizability in the presence of a solvent. Liquid crystals exhibiting various types of orientations, such as nematic liquid crystals, cholesteric liquid crystals, smectic liquid crystals, discotic liquid crystals and ferroelectric liquid crystals which show spontaneous polarization can be used.

Preferred examples of the liquid crystal materials which can be used in the present invention are given below. Examples of nematic liquid crystals include p-methoxybenzylidene-p'-n-butylaniline, p-ethoxybenzylidene-p'-n-butylaniline, octyloxy-cyanobiphenyl, p-n-phenyl-p'-cyanobiphenyl and the like. Examples of cholesteric liquid crystals include cholesteryl nonanate, hexaalkanoyloxybenzene, tetraalkanoyloxy-p-benzoxine, hexaalkoxytriphenylene, hexaalkanoyloxytriphenylene, hexaalkanoyloxytoluxene, hexaalkanoylrufigallol, 2,2',6,6'-tetraaryl-4,4'-bipyranylidene, 2,2',6,6'-tetraaryl-4,4'-bithiopyranylidene, substituted benzoate of hexahydrotriphenylene and the like. Examples of smectic liquid crystals include butyloxybenzylidene-octylaniline, p-cyanobenzylidene-p'-n-octyloxyaniline and the like. Examples of discotic liquid crystals include triphenylene-hexa-n-dodecanoate, 2,3,6,7, 10,11-hexamethoxytriphenylene and the like. Examples of ferroelectric liquid crystals include azomethine compounds (Schiff's compounds), azoxy compounds, esters, γ-lactone compounds, mixtures of chiral compounds, mixtures of achiral liquid crystals and chiral compounds, and the like. Examples of polymeric liquid crystals include polystyrene-polyethylene oxide block copolymers, poly-γ-benzyl-L-glutamate, hydroxypropyl cellulose, poly(p-phenylene terephthalamide), poly[(ethylene terephthalate)-co-1,4-benzoate], poly(4,4'-dimethylazoxybenzene dodecanediol), poly(oligoethylene azoxybenzoate), poly(p-benzamide) and the like.

(2) Diacetylene Derivatives and Diacetylene Derivative Polymers

Examples of diacetylene derivatives include 2,4-hexadiyne-1,6-diol, diacetyelenecarbonic acid, 2,4-hexadiyne-1,6-diol-bis-phenylurethane, ortho- or meta-substituted diphenyldiacetylene, 3,6,13,16-tetraoxaoctadeca-8,10-diine-1,18-diol and the like. Diacetylene derivative polymers having a plane structure can be obtained by solid phase polymerization of diacetylene derivatives by a method of heating, ultraviolet irradiation, electron beam irradiation or radiation. Namely, the oriented diacetylene derivative polymers can be obtained by solid phase polymerization of diacethylene derivatives.

(Method of Orienting the Orienting Material)

Orientation of the orienting material is controlled by applying an electric field, a magnetic field or stress, per-forming orientation of the surface of the collector as a substrate, heating or cooling, and appropriately selecting an optimum solvent and an optimum concentration.

(Orientation of the Substrate Surface)

Methods of orienting the substrate surface are roughly classified into vertical (homeotropic) orientation, parallel (homogeneous) orientation and oblique orientation. Examples of vertical orientation methods include a physical adsorption method using an amphiphilic molecule of p-(octyloxy)-p'-hydroxyazobenzene, dimethylhexadecylammonium bromide, didodecyl N-[11-bromoundecanoyl]-L-glutamate, hexadecyltributylphosphonium bromide, stearyltributylphosphonium bromide, lecithin, cetyltrimethylammonium bromide or the like; and a chemical adsorption method using an organic metal coupling agent such as stearyltrichlorosilane or the like. Examples of parallel orientation methods include a method of rubbing, in one direction, a polymeric film such as polyimide or polyvinyl alcohol, which is laminated on the surface of the collector, with a cloth or paper; a method of grinding, in one direction, the surface of the collector with a material harder than the substrate. Examples of oblique orientation methods include a method of forming an oriented film on the surface of the collector by oblique deposition of a metal or an organic polymeric material by sputtering or vacuum deposition such as electron beam deposition.

Removal of the Orienting Material

A solvent extraction method or thermal decomposition method can be used as the method of removing the orienting material in the method of producing the carbonaceous material having oriented pores.

(Pores of the Carbonaceous Material)

The diameter of the oriented pores of the carbonaceous material used for forming the electrodes of the present invention significantly depends upon the types and mixing ratio of the organic polymer material and the orienting material used in formation, and the type and ratio of the solvent added. The optimum ranges of the diameter and volume of the pores of the carbonaceous material are determined by the ease of preparation of the carbonaceous material, and the mechanical strength and charge-discharge characteristics of the electrodes prepared, and not readily determined. The oriented pores of the carbonaceous material which forms an electrode of the present invention may include micropores having a diameter of 2 nanometers or less, which is measured by a gas adsorption method, and mesopores having a diameter of 2 to 5 nanometers. However, macropores having a diameter of 50 nanometers or more are considered to significantly affect an improvement in the charge-discharge characteristics of rapid charge. In the present invention, therefore, the diameters of the oriented pores are mainly preferably within the range of 50 nanometers to 20 microns, more preferably within the range of 50 nanometers to 10 microns. The average diameter of the pores is further preferably 5 microns or less. When the electrodes are wound in a spiral form, the length of the oriented pores is preferably 50 microns or less in order to prevent cracks in the electrodes depending upon the radius of curvature, and to improve the life performance and charge-discharge efficiency of the battery by improving the property of holding the electrolyte inside the surface of the electrode.

When the volume of the pores of the carbonaceous material which forms the electrodes of the present invention are excessively small, the electrolyte hardly permeates the electrodes. When the volume of the pores of the carbonaceous material is excessively large, the strength of the electrodes is decreased, and the resistance of the electrodes is increased, thereby increasing a current loss. The optimum porosity depends upon the diameter and the distribution state of the pores, and the thickness of the anode. Therefore, the porosity of the anode except the collector is preferably within the range of 10 to 90%, and more preferably within the range of 20 to 80%. The porosity corresponding to the volume of the pores can be measured by a mercury porosimeter or observation on an electron microscope. The porosity can also be determined by calculation from the volumes of the orienting material and the solvent mixed.

(Collectors of the Anode and Cathode)

The collectors serving as the collecting electrodes of the anode and cathode of the present invention function to efficiently supply a current to be consumed by electrode reaction during charge and discharge or to collect the current generated by the electrode reaction. The material used for forming the collectors of the anode and cathode preferably has high conductivity and is inert to the electrode reaction. It is also preferable to use a material which causes no problem in the step of forming the carbonaceous material and the step of forming the active material layer. Preferable examples of such materials include nickel, titanium, copper, aluminum, stainless steel, platinum, palladium, gold, zinc, various alloys, and composite metals comprising at least two of these metals. Examples of shapes which can be used for the collectors include a plate, a foil, a mesh, a sponge, fibers, a punching metal, an expanded metal and the like.

(Cathode Active Material)

As the cathode active material used as the host material for intercalating and deintercalating lithium ions in the present invention, a transition metal oxide, a transition metal sulfide, a lithium-transition metal oxide, or a lithium-transition metal sulfide is preferably used. Examples of transition metals of transition metal oxides and transition metal sulfides include Sc, Y, lanthanides, actinides, Ti, Zr, Hf, V, Nb, Ta, Cr, Mo, W, Mn, Tc, Re, Fe, Ru, Os, Co, Rh, Ir, Ni, Pd, Pt, Cu, Ag and Au, which are elements partially having d-shell or f-shell. More particularly, the metals in the first transition series, e.g., Ti, V, Cr, Mn, Fe, Co, Ni and Cu are preferably used.

(Binder)

When the binder is used for forming the cathode or anode of the present invention, for example, a polyolefin such as polyethylene or polypropylene, or fluororesin such as polyvinylidene fluoride or tetrafluoroethylene polymer is preferably used as the binder.

(Separator)

The separator used in the present invention functions to prevent internal shorts between the anode and the cathode, and sometimes functions to hold the electrolyte.

The separator must have pores which permit movement of lithium ions, and must be insoluble and stable in the electrolyte. Thus, examples of materials which are preferably used for such a separator include glass, polyolefins such as polypropylene and polyethylene, fluororesins, and materials having a micropore and nonwoven fabric structure. A metal oxide film having micropores and a resin film compounded with a metal oxide can also be used. More particularly, when a metal oxide film having a multi-layer structure is used, dendritic deposited lithium metal hardly permeates the separator, thereby obtaining the effect of preventing internal shorts. The use of a fluororesin film which is a flame retardant material, glass which is a non-combustible material, or a metal oxide film can further increase safety.

(Electrolyte)

The methods of using the electrolyte in the present invention include the following three methods;

(1) The method of using the electrolyte as it is.

(2) The method of using a solution of the electrolyte.

(3) The method of using the electrolyte which is fixed by adding a gelling agent such as a polymer to a solution.

An electrolyte solution obtained by dissolving the electrolyte in a solvent is generally held by the separator. It is necessary that the conductivity of the electrolyte at 25° C. be preferably $1 \times 10^{-3}$ S/cm or more, and more preferably $5 \times 10^{-3}$ S/cm or more.

In the lithium battery which uses lithium as the anode active element, the electrolytes and solvents below are preferably used. Examples of electrolytes include acids such as $H_2SO_4$, HCl and $HNO_3$, salts comprising lithium ions ($Li^+$) and Lewis acid ions ($BF_4-$, $PF_6-$, $ClO_4-$, $CF_3SO_3-$ and $BPh_4-$ (Ph: phenyl group)), and salt mixtures thereof. Salts comprising cations such as sodium ion, calcium ion and tetraalkylammonium ion, and the Lewis acid ions can also be used. These salts are preferably sufficiently dehydrated and deoxidized by heating under reduced pressure.

Examples of solvents which are preferably used for the electrolyte include acetonitrile, benzonitrile, propylenecarbonate, ethylenecarbonate, dimethylcarbonate, diethylcarbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethylsulfide, dimethylsulfoxide, methylformate, 3-methyl-2-oxazolidinone, 2-methyltetrahydrofuran, 3-propylsydnone, sulfurdioxide, phosphorylchloride, thionylchloride, sulfurylchloride, and solvent mixtures thereof.

These solvents are preferably dehydrated by activated alumina, molecular sieves, phosphoruspentaoxide or calciumchloride. Some of the solvents are preferably subjected to removal of impurities and dehydrated by distillation in coexistence with an alkali metal in an inert gas.

It is preferable for preventing a leakage of the electrolyte to gel the electrolyte. A polymer which absorbs the solvent of the electrolyte and swells is preferably used as a gelling agent. Examples of such polymers include poly (ethyleneoxide), poly(vinylalcohol), polyacrylamide and the like.

Lithium used as the anode active element is intercalated into the anode active material layer by charging the resultant battery.

(Shape and Structure of Battery)

Examples of shapes of the battery of the present invention include a flat shape, a cylindrical shape, a prismatic shape, a sheet shape and the like. Examples of structures of the battery include a single-layer, multi-layer and spiral (jelly roll) structures and the like. Of these shapes and structure, a spiral type cylindrical battery is preferred because the anode and the cathode are wound with the separator therebetween so that the electrode areas can be increased, and a large current can be caused to flow during charge and discharge. A prismatic battery is preferred in the point that a space for storing an apparatus which contains the secondary battery can effectively be utilized.

Figure 7:
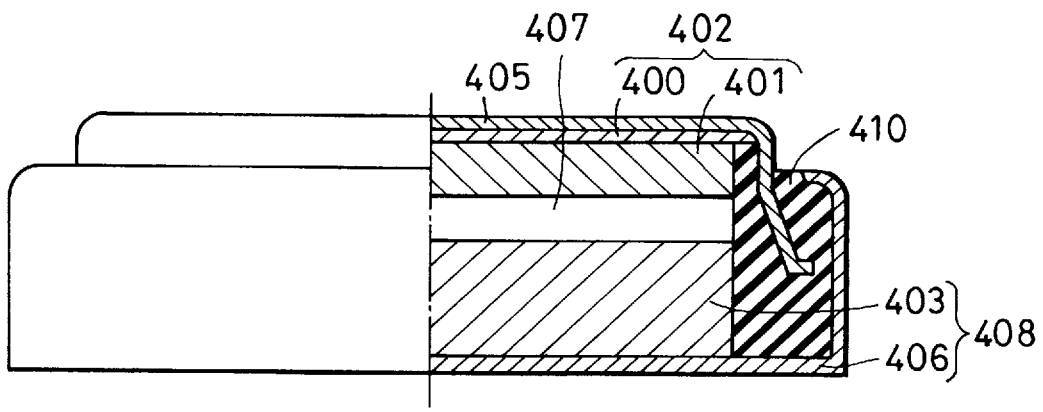
FIG. 7 is a schematic partially sectional view illustrating an example of a single-layer flat battery.

The shape and structure of the battery in accordance with embodiments are described in detail below with reference to FIGS. 7 and 8. FIG. 7 is a schematic partial sectional view of a single-layer flat battery, and FIG. 8 is a schematic partial sectional view of a spiral type cylindrical battery.

Figure 8:
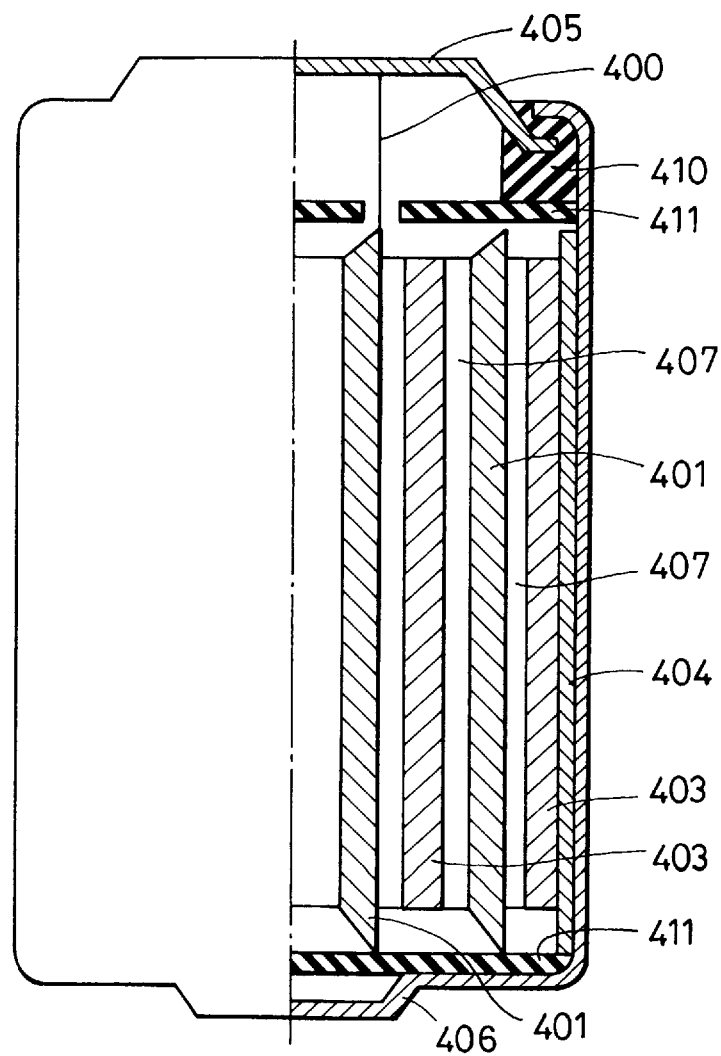
FIG. 8 is a schematic partially sectional view illustrating an example of a spiral type cylindrical battery.

In FIGS. 7 and 8, reference numeral 400 denotes an anode collector; reference numeral 401, an anode active material layer; reference numeral 402, an anode; reference numeral 403, a cathode active material layer; reference numeral 405, an anode terminal (an anode cap); reference numeral 406, a cathode can; reference numeral 407, a separator and electrolyte; reference numeral 408, a cathode; reference numeral 410, an insulating packing; and reference numeral 411, an insulating plate.

An example of the method of assembling the batteries having the structures shown in FIGS. 7 and 8 is described.

The anode active material layer 401 and the cathode active material layer 403 are contained in the cathode can 406 with the separator 407 therebetween. At this time, in the battery having the structure shown in FIG. 8, the anode active material layer 401 and the cathode active material layer 403 are opposed to each other with the separator 407 therebetween and then wound.

After the electrolyte is injected into the can 406, the anode cap 405 is disposed on the cathode can 406 through the insulating packing 410. At least a portion of the cathode can 406 and/or the anode cap 405 is then caulked to complete the battery.

It is preferred that the materials for the lithium battery are prepared, and the battery is then assembled in dry air or dry inert gas from which moisture is sufficiently removed.

Insulating Packing

Examples of materials which can be used for the insulating packing 410 of the present invention include polyolefins, fluororesins, polyamide resins, polysulfone resins, and various types of rubber. Methods of glass sealing, an adhesive, welding and soldering other than "caulking" using a gasket such as the insulating packing shown in FIGS. 7 and 8 can also be used as the method of sealing the battery.

Various organic resin materials and ceramics which are chemically stable in environments (for example, the temperature) where the electrolyte and the battery are used, are preferably used as materials for the insulating plate 411 shown in FIG. 8.

(Outer Can)

The outer can shown in FIGS. 7 and 8 corresponds to the cathode can 406 and the anode cap 405 of the battery. Stainless steel is preferably used as material for the outer can. In particular, a titanium clad stainless sheet, a copper clad stainless sheet and a nickel-plated steel sheet are preferred.

Since the cathode can 406 and the anode cap 405 are also used as a battery case (housing), as shown in FIGS. 7 and 8, the foregoing stainless steel is preferable from the viewpoint of sufficient strength. However, when the cathode can and the anode cap do not serve as the terminal i.e., when the battery housing need not have so much strength, a metal such as zinc, an alloy, plastic such as polypropylene, and a composite material comprising a metal or glass fibers and plastic other than stainless steel can also be used for the housing.

(Safety Valve)

A safety valve is generally provided as a safety means for the case where the internal pressure of the battery is increased. Examples of the safety valve include rubber, a spring, a metallic ball, a rupture foil and the like. Alternatively, the battery may be designed so that a portion of a component of the battery, particularly, the battery housing has low strength so as to be first broken when the internal pressure is abnormally increased, thereby allowing escape of the internal pressure.

The present invention is described in further detail below with reference to examples. However, the present invention is not limited to these examples.

EXAMPLE 1

This example relates to the formation of a lithium secondary battery having the structure shown in FIG. 7 in which a carbonaceous powder having oriented pores is used. The procedure for forming each of the components of the battery and the assembly of the battery are described below with reference to FIG. 7.

(1) Procedure for Forming the Anode

After a nematic liquid crystal, p-methoxybenzylidene-p'-butylaniline, was added to an N,N-dimethylformamide solution of polyvinyl alcohol and mixed therewith, the resultant mixture was dropped in ethanol to prepare precipitates. The thus-obtained precipitates were dried under reduced pressure, gradually heated to 800° C. and burned at this temperature in a stream of argon gas, and then ground to prepare a carbonaceous powder. Observation of the resultant carbonaceous powder under an electron microscope showed oriented pores having a diameter of 5 microns or less. The porosity of the carbonaceous powder was 15%.

After 5 wt % of polyvinylidene fluoride was mixed with the thus-obtained carbonaceous powder, N-methylpyrrolidone was added to the resultant mixture to prepare paste. The thus-obtained paste was coated on a copper foil and dried, and then dried at 150° C. under reduced pressure to form the anode.

(2) Procedure for Forming a Cathode

After electrolytic manganese dioxide and lithium carbonate were mixed at a molar ratio of 1:0.4, the resultant mixture was heated at 800° C. to prepare lithium-manganese oxide. After 3% by weight of carbonaceous powder of acetylene black and 5% by weight of polyvinylidene fluoride were mixed with the thus-prepared lithium-manganese oxide, N-methylpyrrolidone was added to the resultant mixture to prepare paste. The thus-obtained paste was coated on an aluminum foil and dried, and then dried at 150° C. under reduced pressure to prepare a cathode.

(3) Procedure for Forming the Electrolyte

Equivalent ethylene carbonate (EC) and dimethyl carbonate (DMC), from which moisture was sufficiently removed, were mixed to prepare a solvent. 1M (mol/l) lithium tetrafluoroborate was dissolved in the resultant solvent to prepare the electrolyte.

(4) Separator

A microporous polyethylene film was used as the separator.

(5) Assembly of the Battery

The separator holding the electrolyte was held between the anode and the cathode, and then inserted into the cathode can made of titanium clad stainless steel. The insulating packing made of polypropylene and the anode cap made of titanium clad stainless steel were placed in that order on the cathode can, and the cathode cap and the anode cap were caulked to form the lithium secondary battery.

COMPARATIVE EXAMPLE 1

In this example, a secondary battery was formed by the same method as in Example 1 except that the anode was prepared by a different method.

(1) Procedure for Forming the Anode

Polyvinyl alcohol was gradually heated to 800° C. and burned at this temperature in a stream of argon gas, and then ground to prepare a carbonaceous powder. Observation of the resultant carbonaceous powder under an electron microscope showed no oriented pores.

5 wt % of polyvinylidene fluoride was mixed with the resultant carbonaceous powder, and N-methyl pyrrolidone was then added to the resultant mixture to prepare paste. The thus-obtained paste was coated on a copper foil and dried, and then dried at 150° C. under reduced pressure to prepare an anode.

A secondary battery was formed in the same manner as in Example 1 except the above-described treatment was performed.

X-ray diffraction of the carbonaceous powders which were used for the anodes of Example 1 and Comparative Example 1 indicated that the ratio of the half width (radian) of the (002) peak of the carbonaceous powder of Example 1 to the half width of the carbonaceous powder of Comparative Example 1 is 0.45, and that the carbonaceous powder of Example 1 is more graphitized than the carbonaceous powder of Comparative Example 1.

The performance of the batteries of Example 1 and Comparative Example 1 was evaluated with respect to energy density per unit weight of a battery and cycle life, which were measured in a charge-discharge cycle test. The cycle test was carried out under conditions that one cycle comprises charge and discharge of 1 C (current equal to capacity/hour) based on the electrical capacity calculated from the cathode active material used, and a rest time of 30 minutes. A charge-discharge test of a battery was carried out by using HJ-106M produced by Hokuto Denko Co. The charge-discharge test was started from charge, the battery capacity corresponding to the discharge amount by three cycles, and the cycle life corresponding to the number of cycles when the battery capacity was less than 60%. In the lithium batteries, the charge cut-off voltage and the discharge cut-off voltage were set to 4.5 V and 2.5 V, respectively.

Table 1 shows the results of performance evaluation of the lithium secondary batteries of Example 1 and Comparative Example 1. However, the results of evaluation of cycle life, charge-discharge efficiency corresponding to the ratio of the amount of discharge current to the amount of charge current, and energy density (discharge capacity) per unit weight of the battery of Example 1 are standardized based on the values of 1.0 of Comparative Example 1.

TABLE 1

| Cycle life | 1.3 |
|---|---|
| Charge-discharge efficiency | 1.1 |
| Energy density | 1.2 |

The results shown in Table 1 reveal that the use of the anode of Example 1 form of the secondary battery increases the cycle life and charge-discharge efficiency, and permits the formation of the lithium secondary battery having high energy density.

EXAMPLE 2

In this example, a lithium secondary battery having the structure shown in FIG. 7 was formed by the same method as in Example 1 except that an anode was formed by a different method, (1) Procedure for Forming the Anode After a nickel foil was washed with acetone, the surface of the nickel foil was dipped in an ethanol solution of lecithin, dried and then subjected to surface treatment. On the other hand, tetrahydrofuran and a nematic liquid crystal, p-n-phenyl-p'-cyanobiphenyl, were mixed with poly(p-phenylene) to prepare paste. The thus-prepared paste was coated on the nickel foil which was treated as described above and then dried to form the nickel foil coated with a resin layer. The thus-obtained resin layer-coated nickel foil was gradually heated to 800° C. and burned at this temperature in a stream of argon gas, to form the anode.

The observation of the surface of the thus-formed anode under an electron microscope showed that pores having a diameter of 3 microns or less are oriented substantially perpendicularly to the nickel foil. The porosity calculated from an electron microphotography was 60%.

The secondary battery was formed in the same manner as in Example 1 except that the anode formed in this example was used.

COMPARATIVE EXAMPLE 2

In this comparative example, a secondary battery was formed by the same method as in Example 2 except that an anode was formed by a different method.

(1) Procedure for Forming the Anode

Poly(p-phenylene) was gradually heated to 800° C. and burned at this temperature in a stream of argon gas, and then ground to prepare a carbonaceous powder. The observation of the thus-obtained carbonaceous powder under an electron microscope showed no oriented pore.

After 5 wt % of polyvinylidene fluoride powder was mixed with the thus-obtained carbonaceous powder, N-methyl pyrrolidone was added to the mixture to prepare paste. The resultant paste was coated on a copper foil, dried and then dried at 150° C. under reduced pressure to prepare the anode.

The secondary battery was formed in the same manner as in Example 2 except that the anode formed as described above was used.

X-ray diffraction of the carbonaceous powders used for the anodes of Example 2 and Comparative Example 2 reveals that the ratio of the half width (radian) of the (002) peak of Example 2 to the half width of Comparative Example 2 is 0.66, and that the carbonaceous powder of Example 2 is more graphitized than the carbonaceous powder of Comparative Example 2.

Table 2 shows the results of performance evaluation of the lithium secondary batteries formed in Example 1 and Comparative Example 2. Performance evaluation was carried out in the same manner as in Example 1, and the evaluation results of Example 2 are standardized based on the values of 1.0 of Comparative Example 2.

TABLE 2

| Cycle life | 1.1 |
| Charge-discharge efficiency | 1.2 |
| Energy density | 1.3 |

The results shown in Table 2 indicate that the use of the anode of Example 2 for the secondary battery permits the formation of the good lithium secondary battery, as in Example 1.

EXAMPLE 3

In this example, a lithium secondary battery having the sectional structure shown in FIG. 7 was formed by the same method as in Example 1 except that an anode was formed by a different method.

(1) Procedure for Forming the Anode After tetrahydrofuran and a ferroelectric liquid crystal p-hexyloxybenzylidene-p'-amino-2-chloropropylcinnamate were mixed with poly(2,6-naphthalene) to prepare paste, the thus-prepared paste was coated on a rubbed copper foil, and then dried. The thus-obtained resin-coated copper foil was heated to 140° C. in an atmosphere of nitrogen gas, and then gradually cooled to room temperature through temperature ranges of smectic A phase and smectic C phase of the ferroelectric liquid crystal with application of a magnetic field of 1 terrace, to orientate the ferroelectric liquid crystal. The copper foil was then washed with ethanol and dried to prepare the copper foil coated with the resin layer having oriented pores. The thus-obtained resin layer-coated copper foil was gradually heated to 800° C. and burned at this temperature in a stream of argon gas, to form the anode.

The observation of the surface of the anode formed as described above on an electron microscope showed pores which had a diameter of 10 microns or less and which were perpendicularly oriented. The porosity calculated from an electron microphotography was 40%.

The secondary battery was formed in the same manner as in Example 1 except that the anode formed by the above method was used.

COMPARATIVE EXAMPLE 3

In this comparative example, a secondary battery was formed by the same method as in Example 1 except that an anode was formed by a different method.

(1) Procedure for Forming the Anode

Poly(2,6-naphthalene) was gradually heated to 800° C. and burned at this temperature in a stream of argon gas, and then ground to prepare a carbonaceous powder. The observation of the thus-obtained carbonaceous powder under an electron microscope showed no oriented pores.

After 5 wt % of polyvinylidene fluoride was mixed with the carbonaceous powder, N-methyl pyrrolidone was added to the resultant mixture to prepare paste. The thus-obtained paste was coated on a copper foil, dried and then dried at 150° C. under reduced pressure to form an anode.

The secondary battery was formed in the same manner as in Example 3 except the anode formed by the above method was used.

X-ray diffraction of the carbonaceous powders used for the anodes of Example 3 and Comparative Example 3 revealed that the ratio of the half width (radian) of the (002) peak of Example 2 to the half width of Comparative Example 3 is 0.84, and that the carbonaceous powder of Example 3 is more graphitized than the carbonaceous powder of Comparative Example 3.

Table 3 shows the results of performance evaluation of the lithium secondary batteries formed in Examples 3 and Comparative Example 3. The evaluation results of Example 3 are standardized based on the values of 1.0 of Comparative Example 3.

TABLE 3

| Cycle life | 1.1 |
| Charge-discharge efficiency | 1.2 |
| Energy density | 1.4 |

The results shown in Table 3 indicate that the use of the anode of Example 3 for the secondary battery permits the formation of the good lithium secondary battery, as in Example 1.

EXAMPLE 4

A lithium secondary battery having the sectional structure shown in FIG. 7 was formed by the same method as in Example 1 except that an anode was formed by a different method.

(1) Procedure for Forming the Anode

Water, 1,4-dioxane and a diacetylene derivative, 2,4-hexadyine-1,6-diol-bis-phenylurethane were mixed with polyvinyl alcohol to prepare paste. The thus-prepared paste was irradiated with ultraviolet rays by using a high-pressure mercury lamp for 3 hours to cause solid phase polymerization of the diacetylene derivative and crosslinking of polyvinyl alcohol, followed by drying under reduced pressure. The polydiacetylene-containing polyvinyl alcohol was gradually heated to 800° C. and burned at this temperature in a stream of argon gas, and then ground to prepare a carbonaceous powder. The observation of the resultant carbonaceous powder on an electron microscope showed oriented pores having a diameter of 15 microns or less. The porosity was 20%.

After 5 wt % of polyvinylidene fluoride was mixed with the thus-obtained carbonaceous powder, N-methyl pyrrolidone was added to the resultant mixture to prepare paste. After the thus-obtained paste was coated on a copper foil, it was dried and then dried at 150° C. under reduced pressure to form an anode.

The secondary battery was formed in the same manner as in Example 1 except that the anode formed as described above was used.

X-ray diffraction of the carbonaceous powder used for the anode of Example 4 revealed that the ratio of the half width (radian) of the (002) peak of the carbonaceous powder of Example 4 to the half width of Comparative Example 1 is 0.37, and that the carbonaceous powder of Example 4 is more graphitized than the carbonaceous powder of Comparative Example 1.

Table 4 shows the results of performance evaluation of the lithium secondary batteries formed in Examples 4 and Comparative Example 1. The evaluation results of Example 4 are standardized based on the values of 1.0 of Comparative Example 1.

TABLE 4

| | |
|---|---|
| Cycle life | 1.4 |
| Charge-discharge efficiency | 1.2 |
| Energy density | 1.2 |

The results shown in Table 4 indicate that the use of the anode of Example 4 for the secondary battery permits the formation of the good lithium secondary battery, as in Example 1.

EXAMPLE 5

In this example, a lithium secondary battery having the structure shown in FIG. 7 was formed. A carbonaceous material having oriented pores and containing a cathode active material dispersed therein was used for a cathode. The procedure for forming each of the components of the battery and the assembly of the battery are described below.

(1) Procedure for Forming the Cathode

After electrolytic manganese dioxide and lithium carbonate were mixed at a ratio of 1:0.4, the resultant mixture was heated at 800° C. and then ground to prepare a lithium-manganese oxide powder. After water and the thus-prepared lithium-manganese oxide powder were added to polyvinyl alcohol and kneaded therewith, a methanol solution of a nematic liquid crystal, p-methoxybenzylidene-p'-n-butylaniline, was mixed with the resultant mixture, and the solvent was evaporated by drying at 45° C. under reduced pressure. After the liquid crystal was removed by washing with methanol at 30° C., the residue was dried and sintered at 800° C. in an atmosphere of nitrogen gas to prepare the carbonaceous material containing the lithium-manganese oxide dispersed therein. The observation of the thus-formed carbonaceous material containing lithium-manganese oxide dispersed therein under an electron microscope showed oriented pores. The porosity was 30%.

After the thus-obtained carbonaceous material containing lithium-manganese oxide dispersed therein was ground, 5 wt % of polyvinylidene fluoride powder was mixed with the resultant powder, and N-methyl pyrrolidone was added thereto to prepare paste. After the thus-obtained paste was coated on an aluminum foil and dried, and then dried at 150° C. under reduced pressure to form the cathode.

(2) Procedure for Forming the Anode

After 5 wt % of polyvinylidene fluoride powder was mixed with natural graphite fine powder, N-methyl pyrrolidone was added to the resultant mixture to prepare paste. The thus-obtained paste was coated on a copper foil and dried, and then dried at 150° C. under reduced pressure to form the anode.

(3) Procedure for Forming an Electrolyte

A solvent was prepared by mixing equivalent ethylene carbonate (EC) and dimethyl carbonate (DMC), from which moisture was sufficiently removed. 1M (mol/l) of lithium tetrafluoroborate was dissolved in the thus-obtained solvent to form the electrolyte.

(4) Separator

A microporous film of polypropylene was used as the separator.

(5) Assembly of the Battery

The separator holding the electrolyte was held between the anode and the cathode, and inserted into a cathode can made of titanium clad stainless steel. An insulating packing made of polypropylene and an anode cap made of titanium clad stainless steel were placed in turn on the cathode can, and then caulked to form the lithium secondary battery.

COMPARATIVE EXAMPLE 4

In this comparative example, a secondary battery was formed in the same manner as in Example 5 except that the cathode was prepared by the same method as in Example 1.

Table 5 showed the results of performance evaluation of the lithium secondary batteries formed in Example 5 and Comparative Example 4. The performance evaluation was performed by the same method as that employed in Example 1. The evaluation results of Example 5 shown in Table 5 are standardized based on the values of 1.0 of Comparative Example 4.

TABLE 5

| | |
|---|---|
| Cycle life | 1.2 |
| Charge-discharge efficiency | 1.1 |
| Energy density | 1.1 |

The results shown in Table 5 indicate that the use of the cathode of Example 5 having oriented pores for the secondary battery permits the formation of the good lithium secondary battery, as in Example 1.

EXAMPLE 6

In this example, a lithium secondary battery having the structure shown in FIG. 7 was formed by the same method as that employed in Example 5 except that a cathode was formed by a different method.

(1) Procedure for Forming the Cathode

After electrolytic manganese dioxide and lithium carbonate were mixed at a ratio of 1:0.4, the resultant mixture was heated at 800° C. and then ground to prepare a lithium-manganese oxide powder. A nonionic surface active agent (polyoxyethylene sorbitan triolate) and the lithium-manganese oxide powder prepared as described above were added to a 1,2-dichloroethane solution of polyacenaphthylene, followed by agitation. After a 5% m-cresol solution of racemized L- and D-type poly(γ-benzyl-glutamate) was mixed with the resultant mixture, the solvent was gradually evaporated to manifest a liquid crystal phase. The liquid crystal phase was then sintered at 800° C. in a stream of nitrogen gas to prepare a carbonaceous material containing lithium-manganese oxide dispersed therein. The observation of the thus-formed carbonaceous material containing the lithium-manganese oxide dispersed therein showed oriented pores. The porosity was 30%.

After the thus-obtained carbonaceous material containing lithium-manganese oxide dispersed therein was ground, and 5 wt % of polyvinylidene fluoride powder were mixed with the resultant powder, and N-methyl pyrrolidone was added thereto to prepare paste. The resultant paste was coated on an aluminum foil and dried, and then dried at 150° C. under reduced pressure to form a cathode. The secondary battery was formed in the same manner as in Example 5 except that the cathode formed in this example was used.

Table 6 showed the results of performance evaluation of the lithium secondary batteries formed in Example 6 and Comparative Example 4. The evaluation results of Example 6 shown in Table 6 are standardized based on the values of 1.0 of Comparative Example 4.

TABLE 6

| | |
|---|---|
| Cycle life | 1.2 |
| Charge-discharge efficiency | 1.1 |
| Energy density | 1.1 |

The results shown in Table 6 indicate that the use of the cathode of Example 6 for the secondary battery permits the formation of the good lithium secondary battery, as in Example 1.

EXAMPLE 7

In this example, a lithium secondary battery having the structure shown in FIG. 7 was formed by the same method as that employed in Example 5 except that a cathode was formed by a different method from Example 5.

(1) Procedure for Forming the Cathode

A 2M (mol/l) aqueous solution of nickel acetate and 1 m (mol/l) aqueous solution of lithium citrate were mixed at a ratio of 1:1, and the resultant mixture was then dried by a spray dryer, heated at 800° C. in air and ground to prepare a lithium-nickel oxide powder. A nickel foil was washed with acetone, and then subjected to surface treatment by dipping the nickel foil in an ethanol solution of lecitin and then drying.

Tetrahydrofuran, a nonionic surfactant (polyoxyethylene sorbitan triolate), the lithium-nickel oxide powder obtained as described above, and a discotic liquid crystal 2,3,6,7,10,11-hexamethoxytriphenylene were mixed with poly(furfuryl alcohol) to prepare paste.

The thus-prepared paste was coated on the treated nickel foil and dried to form the nickel foil coated with a resin layer. Thus-obtained resin layer-coated nickel foil was gradually heated to 800° C. and burned at this temperature in a stream of argon gas to form the cathode. The observation of the surface of the cathode formed as described above under an electron microscope showed pores which had a diameter of 3 microns or less and which were oriented perpendicularly to the surface of a collector. The porosity calculated from an electron microphotography was 30%.

The secondary battery was formed in the same manner as in Example 5 except that the cathode formed in this example was used.

COMPARATIVE EXAMPLE 5

In this comparative example, a cathode was formed by using a cathode active material which was prepared by a different method from Example 7, and the same anode as Example 4 was used.

(1) Procedure for Forming the Cathode

Nickel carbonate and lithium nitrate were mixed at a molar ratio of 1:1, and the resultant mixture was heated at 800° C. to prepare lithium-nickel oxide. 3 wt % of carbonaceous powder of acetylene black and 5 wt % of polyvinylidene fluoride powder were mixed with the thus-prepared lithium-nickel oxide, and N-methyl pyrrolidone was added to the resultant mixture to obtain paste. After the thus-obtained paste was coated on an aluminum foil and dried, and then dried at 150° C. under reduced pressure to form a cathode. The observation of the surface of the cathode on a scanning electron microscope shows no oriented pore.

A secondary battery was formed in the same manner as in Comparative Example 4 except that the cathode formed as described above was used.

Table 7 showed the results of performance evaluation of the lithium secondary batteries formed in Example 7 and Comparative Example 5. The evaluation results of Example 7 shown in Table 7 are standardized based on the values of 1.0 of Comparative Example 5.

TABLE 7

| | |
|---|---|
| Cycle life | 1.2 |
| Charge-discharge efficiency | 1.1 |
| Energy density | 1.2 |

The results shown in Table 7 indicate that the use of the cathode of Example 7 for the secondary battery permits the formation of the good lithium secondary battery, as in Example 1.

EXAMPLE 8

A secondary battery was formed in the same method as in Example 1 except that the same anode as that formed in Example 1 and the same cathode as that formed in Example 5 were used. Table 8 shows the results of performance evaluation of the secondary batteries formed in Example 8 and Comparative Example 1. The values shown in Table 8 are values of Example 8 which are standardized based on 1.0 of Comparative Example 1.

TABLE 8

| | |
|---|---|
| Cycle life | 1.4 |
| Charge-discharge efficiency | 1.2 |
| Energy density | 1.3 |

Although, in Examples 1 to 8, lithium-manganese oxide or lithium-nickel oxide was used as the cathode active material, the present invention is not limited to these materials, and various materials such as lithium-cobalt oxide, lithium-vanadium oxide and the like can also be used as the cathode active material. Although, in Examples 1 to 8, the same electrolyte was used, the present invention is not limited to this.

The present invention is not limited to the above examples including the constructions and the structures of secondary batteries of the examples. Various modifications and combinations can, of course, appropriately be made within the scope of the gist of the present invention.

As described above, since the present invention is capable of forming a cathode or anode having an increased pore volume for a lithium secondary battery which employs intercalation and deintercalation reaction of lithium ions, it is possible to smoothly effect electrochemical reaction with substantially low current density accompanied with charge and discharge, and permit a flow of large current. In addition, if the present invention is applied to a cathode, the area of contact between a cathode active material and a carbonaceous material used as a conduction auxiliary can be increased, thereby improving the current collecting ability of the cathode.

Further, the present invention is capable of forming a lithium secondary battery having a long cycle life, a high charge-discharge efficiency and a high energy density.

The formation method of the present invention is capable of easily forming a anode and a cathode each of which comprises a carbonaceous material having oriented pores in a simple step.

What is claimed is:

1. A lithium secondary battery at least comprising:
   an anode;
   a cathode;
   a separator disposed between the anode and the cathode; and
   an electrolyte,
   wherein at least one of the anode and the cathode comprises a powdered carbonaceous material having oriented pores.

2. A lithium secondary battery according to claim 1, wherein the cathode comprises a carbonaceous material having oriented pores at least as a component material, the carbonaceous material containing a cathode active material being dispersed therein.

3. A lithium secondary battery according to claim 1, wherein the anode comprises a collector and the carbonaceous material provided on the collector.

4. A lithium secondary battery according to claim 1, wherein the cathode comprises a collector and the carbonaceous material is provided on the collector.

5. A lithium secondary battery according to claim 4, wherein the carbonaceous material contains a cathode active material dispersed therein.

6. A lithium secondary battery according to claim 3, wherein each of the oriented pores has a lengthwise component in the direction toward the collector.

7. A lithium secondary battery according to claim 4, wherein each of the oriented pores has a lengthwise component in a direction toward the collector.

8. A lithium secondary battery according to claim 3, wherein the pores of the carbonaceous material are oriented perpendicularly or substantially perpendicularly to a surface of the collector.

9. A lithium secondary battery according to claim 3, wherein the pores of the carbonaceous material are oriented in parallel or substantially parallel with the surface of the collector.

10. A lithium secondary battery according to claim 3, wherein a surface of the collector on which a layer of carbonaceous material is formed is treated by unidirectional rubbing.

11. A lithium secondary battery according to claim 4, wherein the pores of the carbonaceous material are oriented perpendicularly or substantially perpendicularly to a surface of the collector.

12. A lithium secondary battery according to claim 4, wherein the pores of the carbonaceous material are oriented in parallel or substantially parallel with a surface of the collector.

13. A lithium secondary battery according to claim 4, wherein a surface of the collector on which a layer of carbonaceous material is formed is treated by unidirectional rubbing.

14. A lithium secondary battery according to claim 3, wherein the carbonaceous material is bonded to the collector by using a binder.

15. A lithium secondary battery according to claim 4, wherein the carbonaceous material is bonded to the collector by using a binder.

16. A lithium secondary battery according to claim 1, further comprising a housing for containing the anode, the cathode, the separator and the electrolyte.

17. A lithium secondary battery according to claim 1, wherein the pores have a diameter of 50 nm to 20 $\mu$m.

18. A lithium secondary battery according to claim 1, wherein the pores have a length of 50 $\mu$m or less.

19. A lithium secondary battery according to claim 1, wherein the carbonaceous material has a porosity of 10 to 90%.

20. A lithium secondary battery according to claim 17, wherein the pores have a length of 50 $\mu$m or less.

21. An electrode for a lithium secondary battery comprising:
    a collector; and
    an active material layer which is provided on the collector and which contains a carbonaceous material having oriented pores, said active material layer being able to be permeated by an electrolyte.

22. An electrode for a lithium secondary battery according to claim 21, wherein the carbonaceous material is a powdered carbonaceous material.

23. An electrode for a lithium secondary battery according to claim 21, wherein the carbonaceous material is bonded to the collector by a binder.

24. An electrode for a lithium secondary battery according to claim 21, wherein the pores have a diameter of 50 nm to 20 $\mu$m.

25. An electrode for a lithium secondary battery according to claim 21, wherein the pores have a length of 50 $\mu$m or less.

26. An electrode for a lithium secondary battery according to claim 21, wherein the carbonaceous material has a porosity of 10 to 90%.

27. An electrode for a lithium secondary battery according to claim 24, wherein the pores have a length of 50 $\mu$m or less.

28. An electrode for a lithium secondary battery according to claim 21, wherein the pores are oriented perpendicularly or substantially perpendicularly to a surface of the collector.

29. An electrode for a lithium secondary battery according to claim 21, wherein the pores are oriented in parallel or substantially parallel with a surface of the collector.

30. An electrode for a lithium secondary battery according to claim 21, wherein each of the pores has a lengthwise component in the direction toward the collector.

31. An electrode for a lithium secondary battery according to claim 21, wherein the carbonaceous material further contains a cathode active material.

32. A method of forming an electrode for a lithium secondary battery comprising the step of:

preparing a carbonaceous material having pores, which are provided on a collector, by burning a material containing an organic polymeric material and an orienting material.

33. A method according to claim 32, further comprising the steps of:

grinding the burned carbonaceous material to form a carbonaceous material powder; and bonding the carbonaceous material powder to the collector by using a binder.

34. A method according to claim 32, wherein the material containing the organic polymeric material and the orienting material is coated on the collector and then burned.

35. A method according to claim 34, wherein the coating is performed, after the collector is treated by applying an amphiphilic molecule or an organic metal coupling agent to the collector.

36. A method according to claim 34, wherein the coating is performed, after the collector is treated by forming a polymer film on the collector, and the polymer film is then rubbed unidirectionally.

37. A method according to claim 34, wherein the coating is performed, after forming an oriented film on the surface of the collector by oblique deposition of a metal or organic polymeric material by sputtering or vacuum deposition.

38. A method according to claim 32, wherein the orienting material comprises a liquid crystal material.

39. A method according to claim 32, wherein the orienting material contains at least one of diacetylene derivatives and polymers of diacetylene derivatives.

40. A method according to claim 32, wherein the burning is carried at a temperature within the range of 600° to 3000° C.

41. A method according to claim 32, wherein the burning is carried out in an atmosphere of inert gas.

42. A method according to claim 32, wherein the burning is carried out in an atmosphere of nitrogen gas.

43. A method according to claim 41, wherein hydrogen gas is further mixed in the inert gas.

44. A method according to claim 42, wherein hydrogen gas is further mixed in the nitrogen gas.

45. A method according to claim 32, wherein an active material is further mixed in the material containing the organic polymeric material and the orienting material.

46. A method of producing a lithium secondary battery comprising the steps of:

preparing a first electrode comprising a collector and a carbonaceous material provided on the collector and having oriented pores, the carbonaceous material being formed by burning a material containing an organic polymeric material and an orienting material;

disposing a second electrode opposite to the first electrode;

disposing a separator between the first and second electrodes; and sealing the first and second electrodes, the separator and an electrolyte in a housing.

47. A method according to claim 46, further comprising the steps of:

grinding the burned carbonaceous material to form a carbonaceous material powder; and bonding the carbonaceous material powder to the collector by using a binder.

48. A method according to claim 46, wherein the material containing the organic polymeric material and the orienting material is coated on the collector and then burned.

49. A method according to claim 48, wherein the coating is performed, after the collector is treated by applying an amphiphilic molecule or an organic metal coupling agent to the collector.

50. A method according to claim 48, wherein the coating is performed, after the collector is treated by forming a polymer film on the collector, and the polymer film is then rubbed unidirectionally.

51. A method according to claim 48, wherein the coating is performed, after forming an oriented film on the surface of the collector by oblique deposition of a metal or organic polymeric material by sputtering or vacuum deposition.

52. A method according to claim 46, wherein the orienting material comprises a liquid crystal material.

53. A method according to claim 46, wherein the orienting material contains at least one of diacetylene derivatives and polymers of diacetylene derivatives.

54. A method according to claim 46, wherein the burning is carried at a temperature within the range of 600° to 3000° C.

55. A method according to claim 46, wherein the burning is carried out in an atmosphere of inert gas.

56. A method according to claim 46, wherein the burning is carried out in an atmosphere of nitrogen gas.

57. A method according to claim 55, wherein hydrogen gas is further mixed in the inert gas.

58. A method according to claim 56, wherein hydrogen gas is further mixed in the nitrogen gas.

59. A method according to claim 46, wherein an active material is further mixed in the material containing the organic polymeric material and the orienting material.

60. A lithium secondary battery comprising:

an anode;

a cathode;

a separator disposed between the anode and the cathode; and an electrolyte able to permeate the surface of a carbonaceous material, wherein at least one of the anode and the cathode comprises the carbonaceous material on a collector, the carbonaceous material having pores oriented perpendicularly or substantially perpendicularly to the collector.

* * * * *